United States Patent [19]

Wu et al.

[11] Patent Number: 5,320,792
[45] Date of Patent: Jun. 14, 1994

[54] PROCESS FOR THE PREPARATION OF LAS CERAMIC SINTERED BODIES

[75] Inventors: Nan-Chung Wu, Tainan; Sheng Yang, Taipei, both of Taiwan

[73] Assignee: National Science Council, Taipei, Taiwan

[21] Appl. No.: 62,908

[22] Filed: May 11, 1993

[51] Int. Cl.⁵ .............................................. C04B 35/18
[52] U.S. Cl. ....................................... 264/66; 501/3; 501/7; 501/12; 501/151
[58] Field of Search .................. 264/66; 501/3, 7, 151, 501/12

[56] References Cited

U.S. PATENT DOCUMENTS

| H626 | 4/1989 | Covino | 501/12 |
| 5,147,829 | 9/1992 | Hench | 501/12 |
| 5,232,877 | 8/1993 | Larnac | 264/66 |

FOREIGN PATENT DOCUMENTS 955653 4/1964 United Kingdom ..................... 501/3

OTHER PUBLICATIONS

Hidehiko Kobayashi, et al, "Preparation of β-Spodumene Powder by Sol-Gel Process and Properties of Sintered Bodies" (Department of Applied Chemistry, Faculty of Engineering, Saitama University, 255, Shimo-ohkubo, Urawa-shi 338 *Research and Development Division, Chichibu Cement Co., Ltd., 5310, Mikajiri, Kumagaya-shi, 360)-pp. 703-708.

Primary Examiner—James Derrington
Attorney, Agent, or Firm—Ladas & Parry

[57] ABSTRACT

Disclosed is a process for preparing $Li_2O$—$Al_2O_3$—$SiO_2$ ceramic sintered bodies. Lithium fluoride powder is added to a calcined $Li_2O$—$Al_2O_3$—$SiO_2$ powder prepared by sol-gel process as sintering agent. The resulting powder mixture is compressed into a molded article and sintered at a temperature of 950°-1250° C. to obtain the sintered bodies of the invention. The sintered bodies according to the present invention have a relative density of 97.9% and a thermal expansion coefficient of $10^{-7}/°C.$ magnitude.

8 Claims, 11 Drawing Sheets

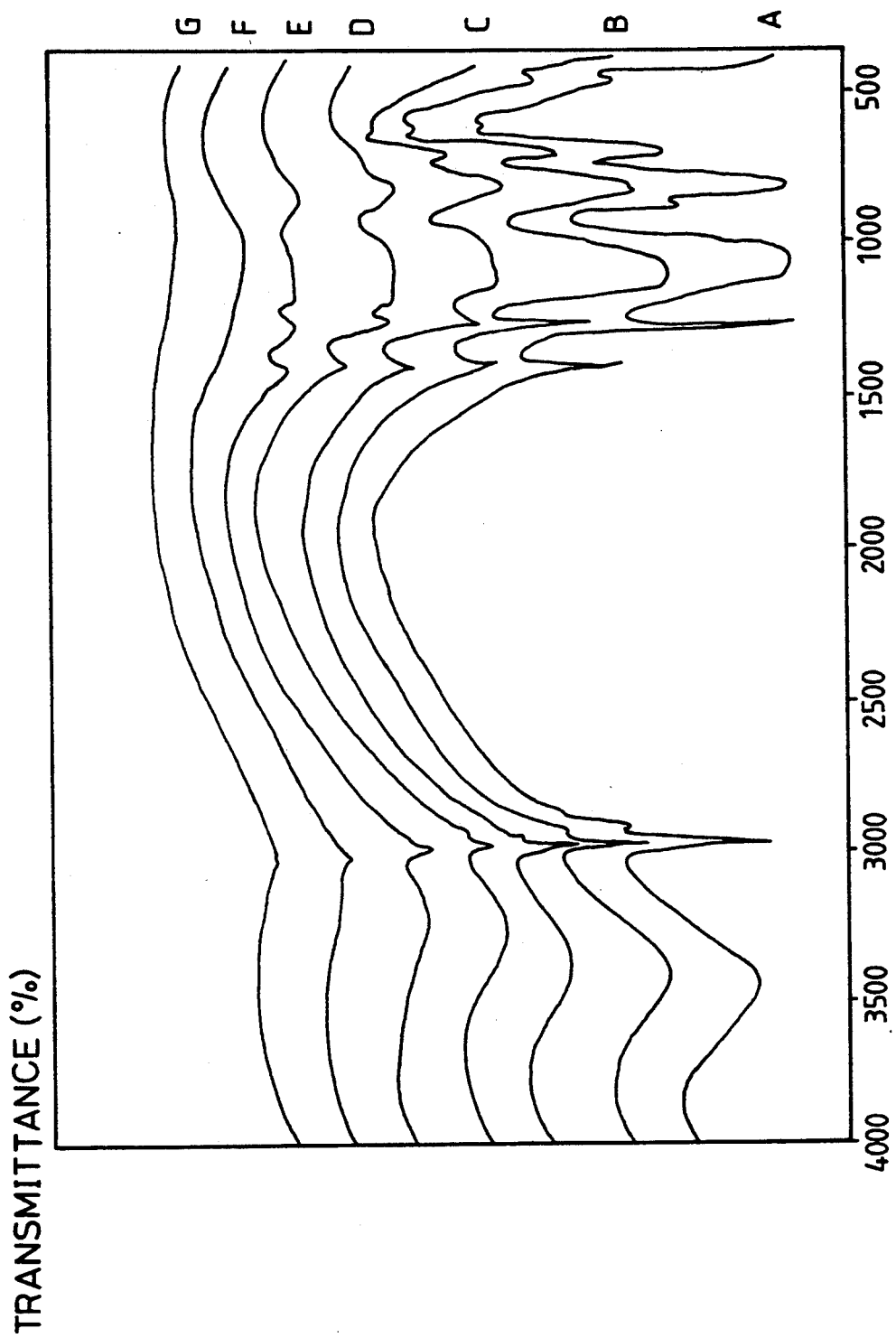

PROCESS FOR THE PREPARATION OF LAS CERAMIC SINTERED BODIES

BACKGROUND OF THE INVENTION

The present invention relates to a process for the preparation of a $Li_2O-Al_2O_3-SiO_2$(LAS) ceramic sintered body, and in particular to a process for preparing a ceramic LAS sintered body by adding lithium fluoride to a calcined LAS ceramic powder as sintering agent and sintering at a temperature of 950° C.-1250° C.

$Li_2O-Al_2O_3-n\ SiO_2$ ceramics (n is 2,4, 6 and 8 where n=2 is eucryptite, n=4 is spodumene, n=6 is lithium orthoclase and n=8 is petalite), due to having very low thermal expansion coefficient, have been widely used as thermal shock-resistant ceramics in high temperature applications to prevent the cracks originated from thermal shocks. Among them, $\beta$-spodumene with a zero-approaching thermal expansion coefficient, $9 \times 10^{-7}/°C.$, and superior mechanical strength, chemical resistance and dimensional stability, has been applied in the manufacture of components of heat exchangers, frames of microwave ovens, and base plates of electromagnetic furnaces etc.

Conventionally, low thermal expansion coefficient ceramic materials, like LAS ceramic materials, are fabricated by glass-forming technique, a technique traditionally used in the manufacture of glass-ceramics. This technique includes melting the raw material at a temperature of above 1500° C., fabricating the molten material into desired shapes and heat treating the shaped ceramics. The homogeneity of the produced ceramics usually is not satisfactory, and the scale of energy consumed in melting is high. Furthermore, in the manufacture of some high performance products, in particular multiple-component ceramic products, the products manufactured by glass-forming technique cannot meet the desired requirements.

In recent years, sol-gel processing has been widely used in the manufacture of ceramics because of inherent advantages compared to conventional processing. For example, the high surface area of dried gels can result in very high reactivity which permits low temperature processing. By starting with well mixed solutions or sols, chemical homogeneity even on the molecular scale can be obtained. However, the gels prepared by the sol-gel processes can shrink non-uniformly during the drying and calcinating, resulting in partial collapse, hardening and agglomeration of the gels. Accordingly, grinding or ball milling of the dried gels is necessary. This however will inevitably reduce the purity and the forming property of the resulting powders, render the sintered bodies porous, undensified, and thus affect the mechanical properties of the final products.

A technical report entitled "Preparation of $\beta$-spodumene powder by sol-gel process and properties of sintered bodies" (Hidehiko Kobayashi et al Journal of Ceramic Soc. Japan, 98(7), 1990, 703) discloses a $\beta$-spodumene powder prepared from alumina sol, silica sol, and lithium nitrate solution by sol-gel process. Sintered bodies are then obtained from the powder. The relative density of the sintered bodies was 96% when sintered at a temperature of 1000°-1100° C. The average thermal expansion coefficient of the sintered bodies was $1.4 \times 10^{-6}/°C.$ The porosity of the sintered bodies was still high and the pore size was about 1-10 $\mu m$.

SUMMARY OF THE INVENTION

It is therefore an object of the present invention to provide a process for the preparation of LAS ceramic sintered bodies with a higher relative density and a lower thermal expansion coefficient.

In order to attain the above object, the process of the present invention includes: (a) preparing a $Li_2O-Al_2O_3-SiO_2$ ceramic powder from a solution of alumina sol, silica sol and lithium nitrate, wherein the molar ratio of $Li^+:Al^{+3}:Si^{+4}$ is 1:1:2; (b) calcining the powder at a temperature of 550° C.-750° C.; (c) intimately mixing a lithium fluoride powder with the calcined powder by using an alcohol as wetting agent, wherein the content of the lithium fluoride powder is 0.5-5 percent by weight based on the calcined powder; (d) drying and fabricating the resulting powder of step (c) into a molded article; and (e) sintering the molded article at a temperature of 950°-1250° C. to obtain the sintered body.

BRIEF DESCRIPTION OF THE DRAWINGS

The present invention can be fully understood by a reading of the subsequent detailed description of the examples with reference to the accompanying drawings, wherein: 7

FIG. 3 is an Fourier Transform Infra Red (FTIR) spectrum diagrams of uncalcined LAS ceramic powder and the LAS ceramic powders which have been calcined at 550° C., 600° C., 650° C., 750° C., 850° C., and 950° C. respectively;

d surface of the sample

Figure 8A:
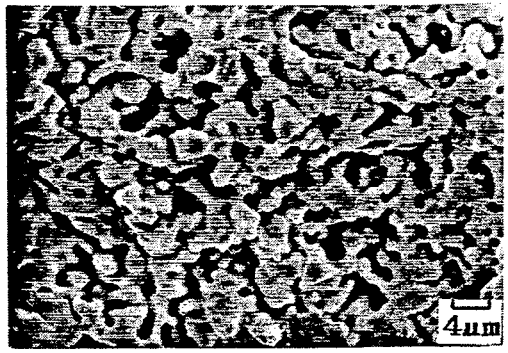
FIG. 8 is a SEM of the fractured surface of the sample disc prepared from LAS powder with addition of 0.5 wt % of LiF and sintered at a temperature of 1050° C. with a soaking time of 5 hours.
FIG. 8B is a SEM of the fractured surface of the sample disc prepared from LAS powder with addition of 1 wt % of LiF and sintered at a temperature of 1050° C. with a soaking time of 5 hours.
FIG. 8C is a SEM of the fractured surface of the sample disc prepared from LAS powder with addition of 2 wt % of LiF and sintered at a temperature of 1050° C. with a soaking time of 5 hours.
Figure 8B:
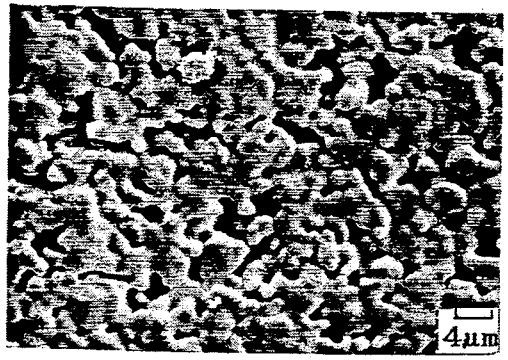
Figure 8C:
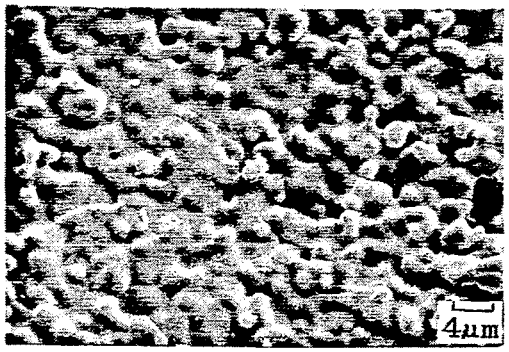
Figure 8D:
Figure 8E:
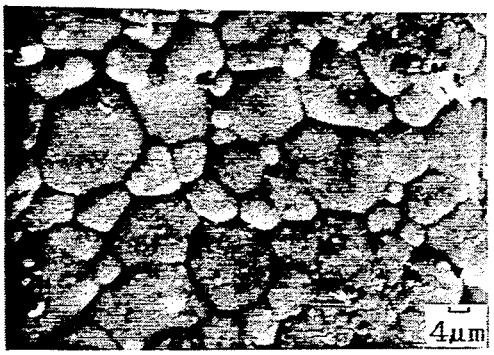
Figure 9A:
Figure 9B:
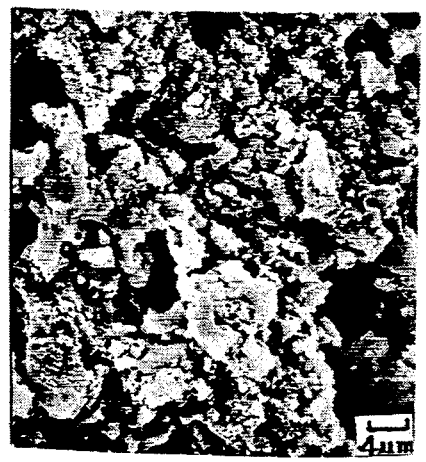
Figure 9C:
Figure 9D:
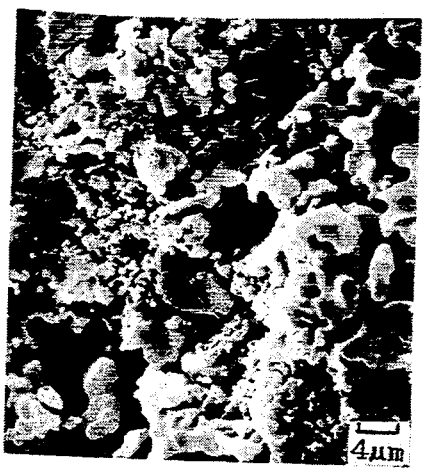
Figure 9E:
Figure 9F:
Figure 10:
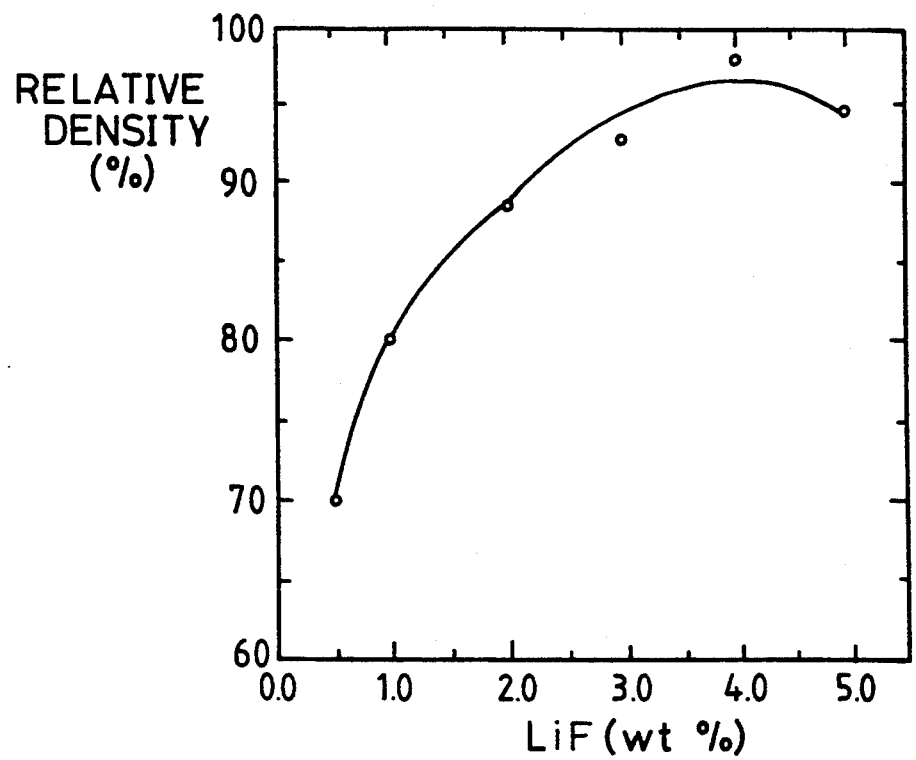
Figure 11:
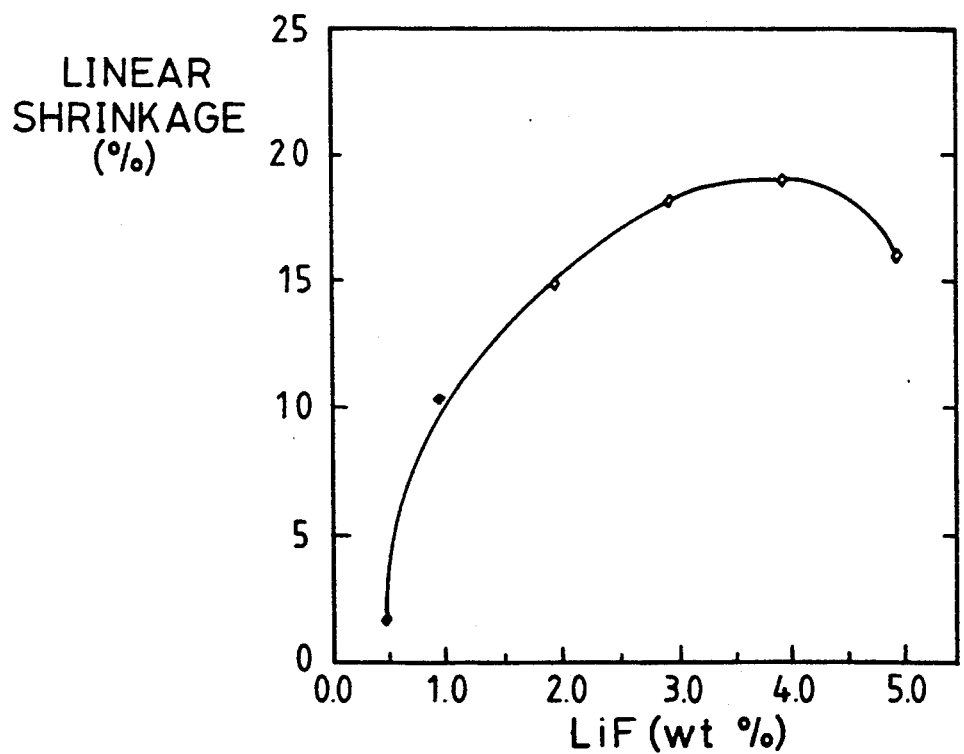

FIG. 8D is a SEM of the fractured surface of the sample disc prepared from LAS powder with addition of 4 wt % of LiF and sintered at a temperature of 1050° C. with a soaking time of 5 hours;

FIG. 8E is a SEM of the fractured surface of the sample disc prepared from LAS powder with addition of 5 wt % of LiF and sintered at a temperature of 1050° C. with a soaking time of 5 hours;

FIG. 9A is a SEM of the fractured surface of the sample disc prepared from LAS powder with no addition of LiF and sintered at a temperature of 950° C. with a soaking time of 5 hours;

FIG. 9B is a SEM of the fractured surface of the sample disc prepared from LAS powder with no addition of LiF and sintered at a temperature of 1050° C. with a soaking time of 5 hours;

FIG. 9C is a SEM of the fractured surface of the ample disc prepared from LAS powder with no addition of LiF and sintered at a temperature of 1150° C. with a soaking time of 5 hours;

FIG. 9D is a SEM of the fractured surface of the sample disc prepared from LAS powder with no addition of LiF and sintered at a temperature of 1250° C. with a soaking time of 5 hours;

FIG. 9E is a SEM of the fractured surface of the sample disc prepared from LAS powder with no addition of LiF and sintered at a temperature of 1300° C. with a soaking time of 5 hours;

FIG. 9F is a SEM of the fractured surface of the sample disc prepared from LAS powder with no addition of LiF and sintered at a temperature of 1350° C. with a soaking time of 5 hours;

FIG. 10 shows the dependence of the relative densities of the LAS ceramic sintered bodies of Example 8 upon the amount of lithium fluoride added; and FIG. 11 shows the dependence of the linear shrinkage of the LAS ceramic sintered bodies of Example 8 upon the amount of lithium fluoride added.

DETAILED DESCRIPTION OF THE INVENTION

According to the process of the present invention, the $Li_2O$—$Al_2O_3$—$SiO_2$ ceramic powder is prepared by sol-gel processes. The LAS ceramic powder is prepared by sequentially mixing silica sol, alumina sol and lithium nitrate into a solution, hydrolyzing the solution to obtain a sol, solidifying the sol to obtain a gel and finally drying and grinding the gel.

The silica sol can be made by, for example, mixing tetraethylorthosilicate, ethanol, deionized water and hydrochloric acid in a molar ratio of 1:40:40:0.3. The alumina sol can be made by, for example, mixing aluminum tri-sec-butoxide, deionized water and hydrochloric acid in a molar ratio of 1:100:0.2. The lithium sol can be made by dissolving lithium nitrate in deionized water.

It is important when mixing the silica sol, alumina sol and lithium nitrate to form a mixture solution, first mixing silica sol with alumina sol to form a mixture and then adding lithium nitrate thereto. Also the amount of the silica sol, alumina sol and lithium nitrate should make the molar ratio of $Li^+$:$Al^{+3}$:$Si^{+4}$ equal 1:1:2.

The mixture solution is then heated to 70°–80° C. to hydrolyze to obtain a sol. The sol is refluxed for 70–90 minutes to get an insoluble gel. The gel is then dried at a temperature of 40°–50° C. and ground to obtain LAS ceramic powder. A ball mill with alumina balls as grinding material is particularly suitable for the grinding of the dried gels.

According to the present process, in order to remove impurities such as organic functional groups contained in the LAS powders and avoid cracking in the subsequent sintering step, the LAS powder must be calcined at a temperature of 550°–750° C.. Preferably, the LAS ceramic powder is calcinated at a temperature of 600° C. with a soaking time of 4 hours and a heating rate of 3° C./min.

After the LAS powder is calcinated, sintering agent of the present invention, lithium fluoride powder is added. The amount of lithium fluoride added ranges from 0.5–5 percent by weight based on the calcinated powder. Preferably, the amount of lithium fluoride is 4 percent by weight. According to the present process, the added lithium fluoride must be intimately mixed with the calcinated powder. A wetting agent should be added. The wetting agent can be an alcohol, for example ethanol. A ball mill is particularly suitable for this purpose.

The resulting powder mixture can then be dried and fabricated into desired shape for sintering. According to the present process, the shaped article is sintered at a temperature of 950°–1250° C. to obtain the sintered body. Preferably, the sintering is conducted at a temperature of 1050° C. with a heating rate of 3° C./min and a soaking time of 5 hours.

The following examples illustrate the preparation of sintered bodies of β-spodumene according to the present invention.

EXAMPLE 1

A clear silica sol was prepared by mixing tetraethylorthosilicate ($Si(OC_2H_5OH)_4$, Janssen Chemical Co.) under reflux with absolute ethanol (Santoku Yakuhin Co. Ltd.), deionized water and hydrochloric acid in a molar ratio of 1:40:40:0.3. Similarly, a clear alumina sol was prepared by mixing aluminium tri-sec-butoxide ($Al(OC_4H_9)_3$, Aldrich Chemical Co.), hot deionized water and hydrochloric acid in a molar ratio of 1:100:0.2. A lithium nitrate was prepared by dissolving lithium nitrate Fluka Co.) into deionized water.

A mixture solution with the molar ratio of $Li^+:Al^{+3}:Si^{+4}=1:1:2$ was prepared by first adding the prepared alumina sol to the silica sol to form a mixture and then adding the lithium nitrate. The mixture solution was stirred, heated to a temperature in a thermostatic bath, and cooled under reflux until the sol was solidified to a gel. The synthesized gel was dried at 50° C. for one day, milled with a ball mill and sieved to yield a dried LAS ceramic powder.

Figure 1:
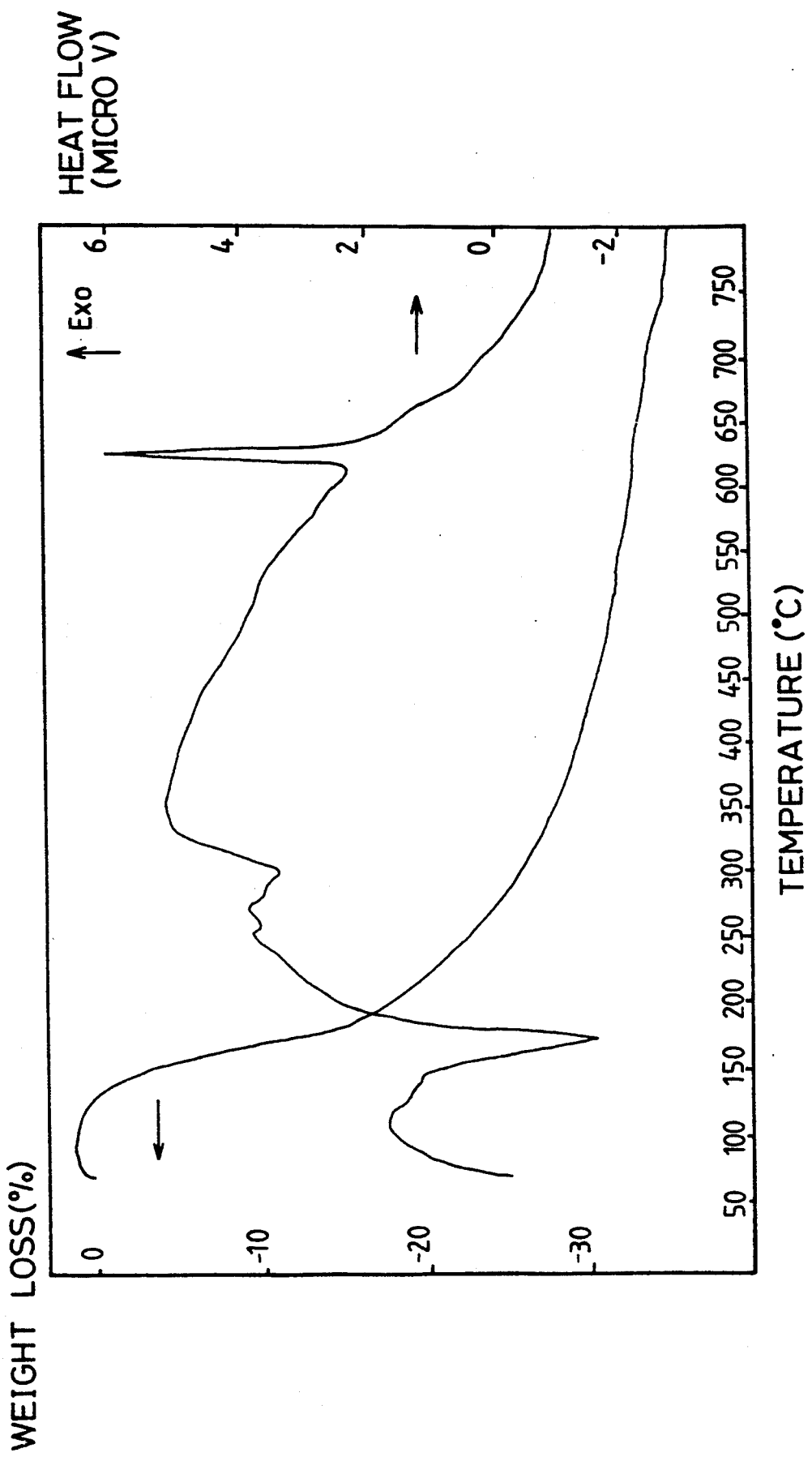
FIG. 1 is a Differential Thermal Analysis/Thermal Gravity Analysis (DTA/TGA) scanning diagram of the dried LAS ceramic powder prepared by the procedures set forth in Example 1.

Thermal analysis was conducted on the dried LAS ceramic powder. The results were shown in FIG. 1, which is the DTA/TGA diagram. FIG. 1 shows an endothermic reaction peak at 175° C. and a weight loss of 15 wt % indicating the removal of water and residual organics; a broad endothermic reaction peak at 270°–320° C. indicating the evolution of crystal water; an exothermic reaction peak at around 330° C. indicating the burning of alkyl group and a sharp exothermic reaction peak at 630° C. indicating the formation of the crystals of β-spodumene.

Figure 2:
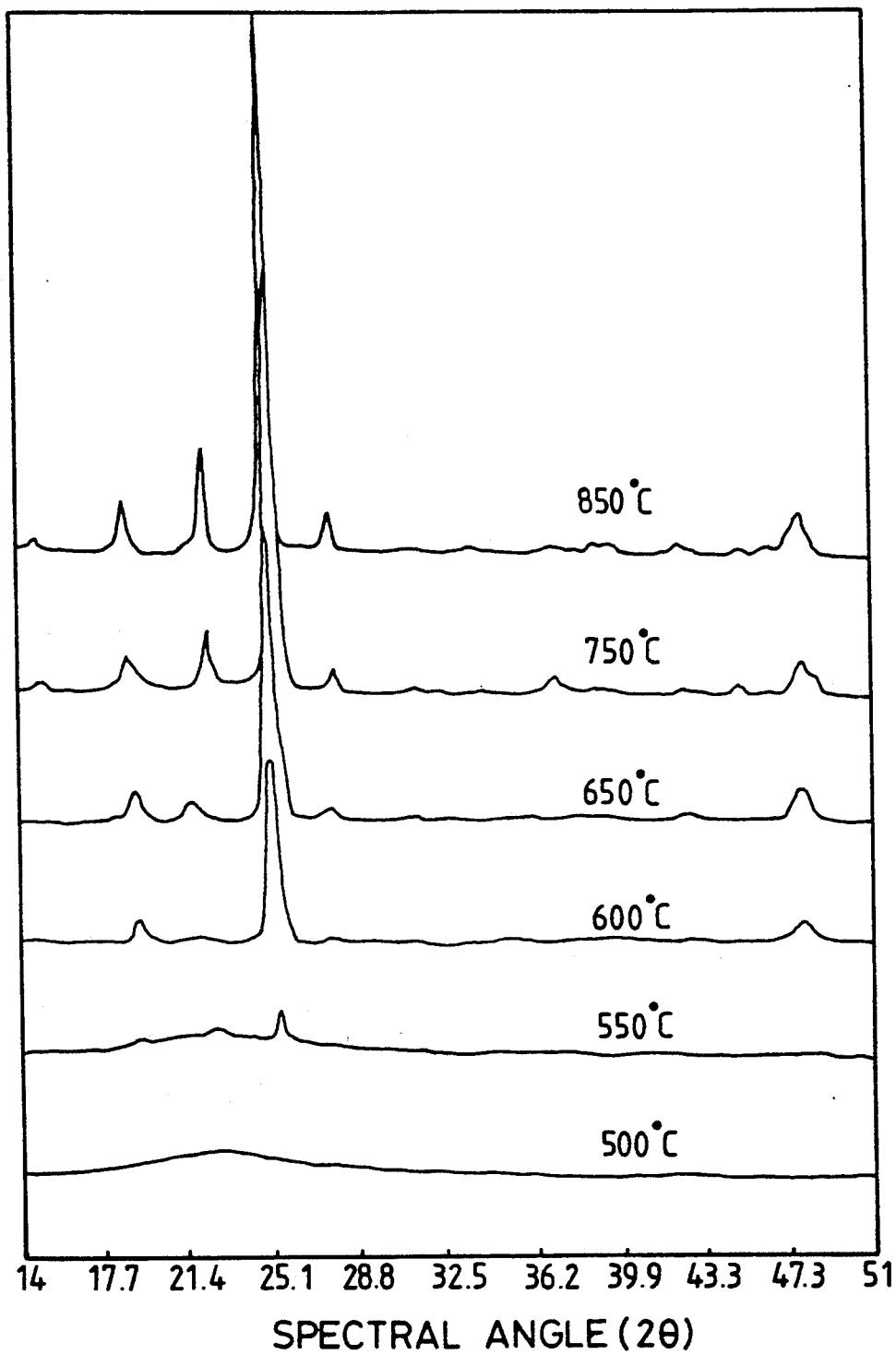
FIG. 2 is X-ray diffraction diagram of the dried LAS ceramic powder prepared by the procedures set forth in Example 1.

X-ray diffraction analysis was also conducted on the dried LAS ceramic powder. FIG. 2 shows the X-ray diffraction results of the LAS ceramic powder. As can be seen from the drawing, at 500° C. the powder was amorphous, and sharp peaks appeared at temperatures above 600° C.. This indicates the formation of β-spodumene and is consistent with the results of thermal analysis.

EXAMPLE 2

The LAS ceramic powder of Example 1 was calcinated at 550° C., 600° C., 650° C.. 750° C., 850° C., and 950° C. respectively at a heating rate of 3° C./min for 4 hours. FTIR spectrum analysis was conducted on the calcined sample powders. The results are shown in FIG. 3., in which A indicates the uncalcined LAS powder, and B,C,D,E,F,G indicate respectively sample powders calcined at 550° C., 600° C., 650° C., 750° C., 850° C. and 950° C.. As shown in FIG. 3, the peaks appear at almost the same wave numbers for both uncalcined sample powder and calcined sample powders, but the peaks flatten when calcining temperature rises, revealing that the amount of organic functional groups have decreased as the calcining temperature is raised.

EXAMPLE 3

To the calcined LAS ceramic powder prepared by Example 2, was added 4 percent by weight of lithium fluoride (Merck Co., Germany), ball milled and granulated. The granulated powder was compressed into several sample discs under a CIP pressure of 200 MPa, and heated in a thermal dilatometer. The results are shown in FIG. 4B.

COMPARATIVE EXAMPLE 1

Sample discs were prepared by the same procedures as above except that no lithium fluoride was added to the calcined LAS ceramic powder. The sample discs for comparison were also heated in a thermal dilatometer under same conditions. The results are shown in FIG. 4A.

Figure 4A:
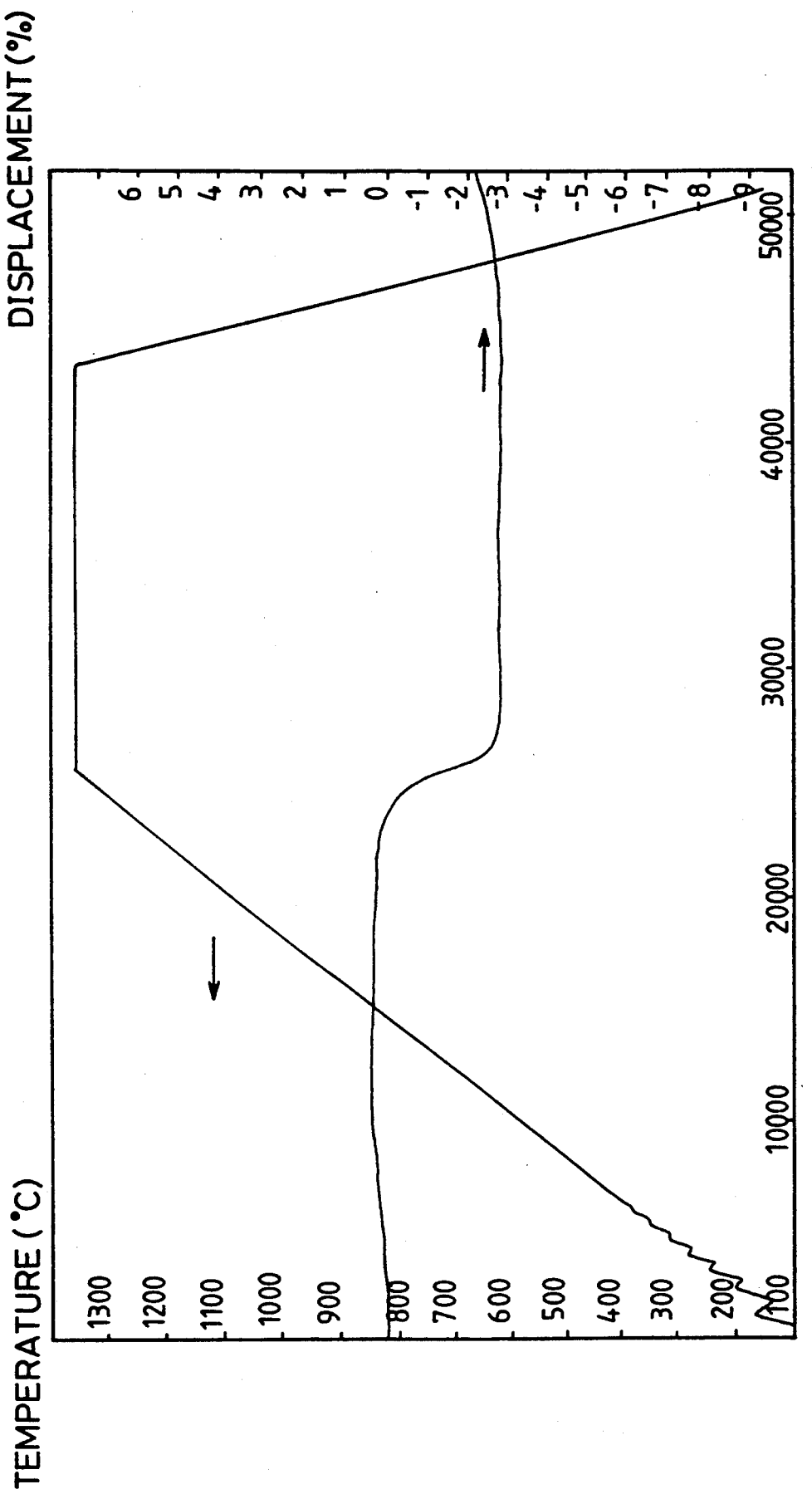
FIG. 4A shows the results of heating sample discs prepared by the procedures set forth in comparative Example 1 in a thermal dilatometer.
Figure 4B:
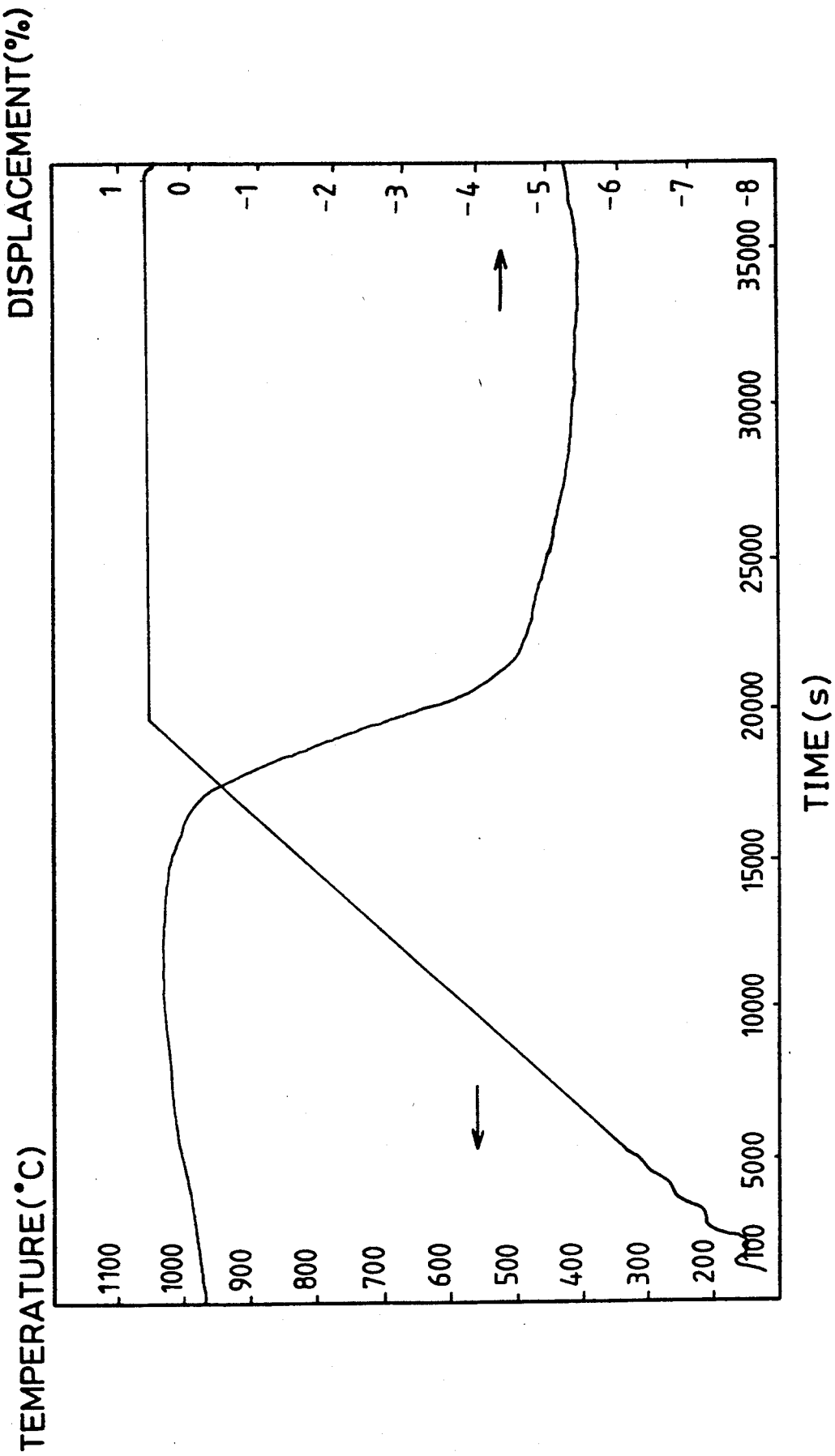
FIG. 4B shows the results of heating sample discs prepared by the procedures set forth in Example 3 in a thermal dilatometer.

As can be seen from FIG. 4A and FIG. 4B, the sample discs with the addition of lithium fluoride shrink at a lower temperature than the sample disc without the addition of lithium fluoride. This indicates that addition of the sintering agent of the present invention can lower the initial sintering temperature of the LAS ceramic powder.

EXAMPLE 4

Sample discs were prepared by the same procedures as set forth in Example 3, except that 3 percent by weight of lithium fluoride were added. The sample discs were heated at a temperature of 950° C. with different soaking times.

Figure 5A:
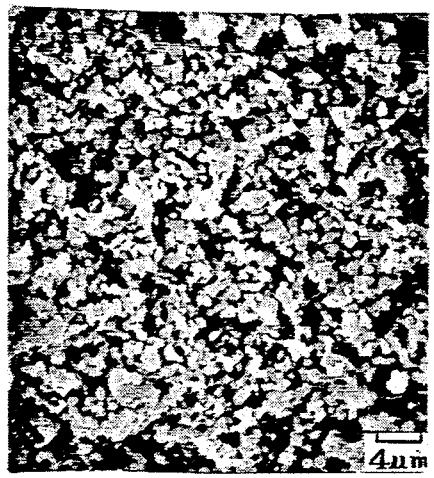
FIG. 5A is a Scanning Electron Microphotographs (SEM) of the fractured surface of the sample disc prepared from LAS powder with addition of 3 wt % of LiF and sintered at a temperature of 950° C. with a soaking time of 2.5 hours.
Figure 5B:
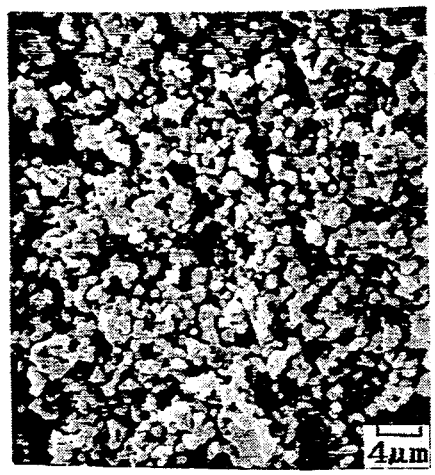
FIG. 5B is a SEM of the fractured surface of the sample disc prepared from LAS powder with addition of 3 wt % of LiF and sintered at a temperature of 950° C. with a soaking time of 5 hours.
Figure 5C:
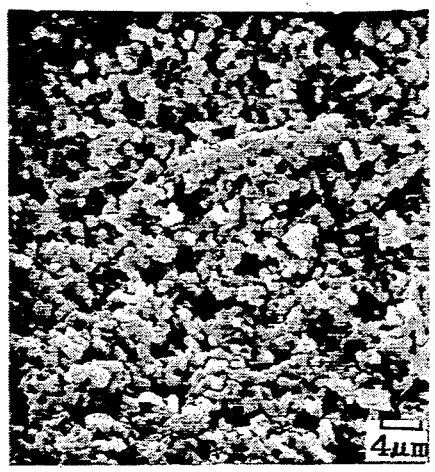
FIG. 5C is a SEM of the fractured surface of the sample disc prepared from LAS powder with addition of 3 wt % of LiF and sintered at a temperature of 950° C. with a soaking time of 10 hours.

The scanning electron microphotographs(SEM) of the fractured surface of the sintered bodies were respectively shown in FIG. 5A, FIG. 5B, and FIG. 5C, wherein FIG. 5A is the SEM with a soaking time of 2.5 hours, FIG. 5B is the SEM with a soaking time of 5 hours and FIG. 5C is the SEM with a soaking time of 10 hours. As can be seen from FIG. 5A, FIG. 5B and FIG. 5C, the grain sizes are all about 1 µm despite the increasing of the soaking time. This is due to the insufficiency of the sintering temperature, and reveals that the sintered bodies were not densified.

EXAMPLE 5

Sample discs were prepared by the same procedures as set forth in Example 3, except that 3 percent by weight of lithium fluoride was added. The sample discs were sintered at different temperatures with different soaking times. The scanning electron microphotographs of the fractured surface of the sintered bodies were respectively shown in FIG. 6A, FIG. 6B, FIG. 6C and FIG. 6D wherein FIG. 6A is the SEM sintered at 1050° C. with a soaking time of 2.5 hours, FIG. 6B is the SEM sintered at 1050° C. with a soaking time of 5 hours, FIG. 6C is the SEM sintered at 1050° C. with a soaking time of 10 hours and FIG. 6D is the SEM sintered at 1350° C. with a soaking time of 2.5 hours.

Figure 6A:
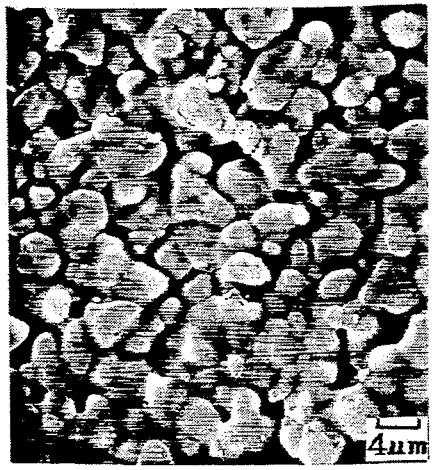
FIG. 6A is a SEM of the fractured surface of the sample disc prepared from LAS powder with addition of 3 wt % of LiF and sintered at a temperature of 1050° C. with a soaking time of 2.5 hours.
Figure 6B:
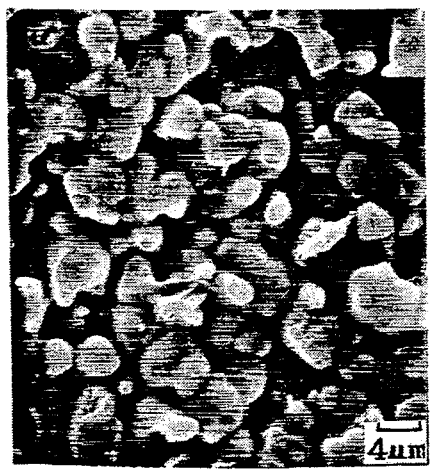
FIG. 6B is a SEM of the fractured surface of the sample disc prepared from LAS powder with addition of 3 wt % of LiF and sintered at a temperature of 1050° C. with a soaking time of 5 hours.
Figure 6C:
FIG. 6C is a SEM of the fractured surface of the sample disc prepared from LAS powder with addition of 3 wt % of LiF and sintered at a temperature of 1050° C. with a soaking time of 10 hours.
Figure 6D:
FIG. 6D is a SEM of the fractured surface of the sample disc prepared from LAS powder with addition of 3 wt % of LiF and sintered at a temperature of 1350° C. with a soaking time of 2.5 hours.

As shown in FIG. 6A and FIG. 6B, the grain sizes are about 4–5 µm, indicating the sintered bodies were more densified. However, as can be seen from FIG. 6C, melting-like phase appeared. This phenomenon becomes more evident when the sample discs were sintered at 1350° C., as can be seen from FIG. 6D. The above shows that the preferred sintering temperature is 1050° C. and the preferred soaking time is 2.5 hours and 5 hours.

EXAMPLE 6

Sample discs were prepared by the same procedures as set forth in Example 3, except that 0.5, 1, 2, 4, 5 percent by weight of lithium fluoride are respectively added. The sample discs were sintered at 1050° C. with a soaking time of 2.5 hours.

Figure 7A:
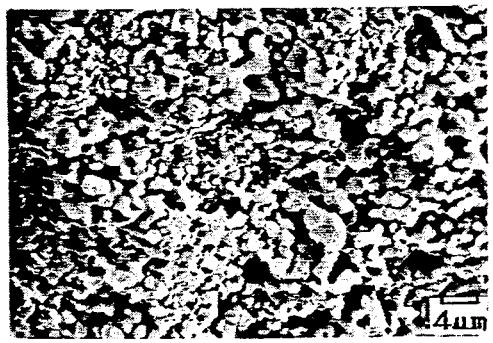
FIG. 7A is a SEM of the fractured surface of the sample disc prepared from LAS powder with addition of 0.5 wt % of LiF and sintered at a temperature of 1050° C. with a soaking time of 2.5 hours.
Figure 7B:
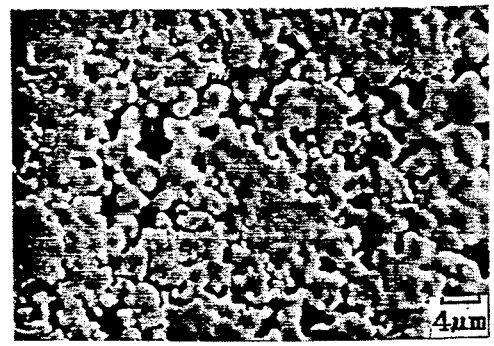
FIG. 7B is a SEM of the fractured surface of the sample disc prepared from LAS powder with addition of 1 wt % of LiF and sintered at a temperature of 1050° C. with a soaking time of 2.5 hours.
Figure 7C:
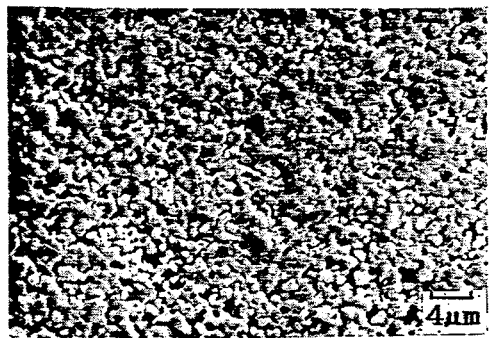
FIG. 7C is a SEM of the fractured surface of the sample disc prepared from LAS powder with addition of 2 wt % of LiF and sintered at a temperature of 1050° C. with a soaking time of 2.5 hours.
Figure 7D:
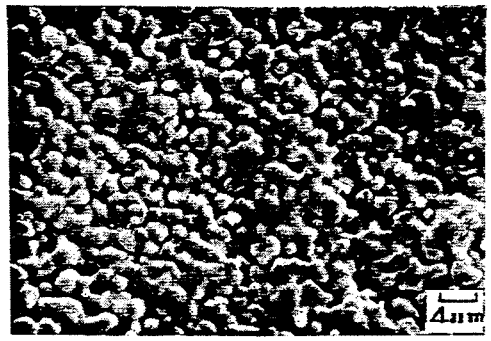
FIG. 7D is a SEM of the fractured surface of the sample disc prepared from LAS powder with addition of 4 wt % of LiF and sintered at a temperature of 1050° C. with a soaking time of 2.5 hours.
Figure 7E:
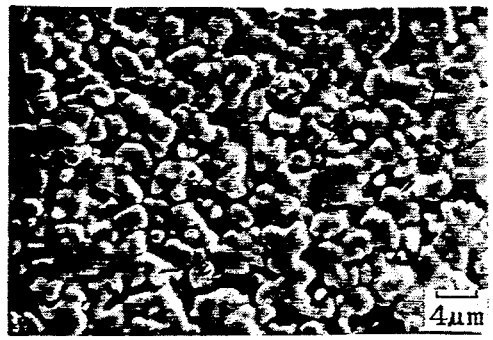
FIG. 7E is a SEM of the fractured surface of the sample disc prepared from LAS powder with addition of 5 wt % of LiF and sintered at a temperature of 1050° C. with a soaking time of 2.5 hours.

The scanning electron microphotographs of the fractured surface of the sintered bodies were respectively shown in FIG. 7A, FIG. 7B, FIG. 7C, FIG. 7D and 7E. As shown in FIG. 7A 0.5 wt % lithium fluoride), and FIG. 7B (1 wt % of lithium fluoride ), there are still some pores remaining in the sintered bodies. However, when the amount of lithium fluoride is increased to 2 wt % and above, the sintered bodies are well densified and the grain size grows gradually, as can be seen from FIG. 7C (2 wt %), FIG. 7D (4 wt %), and FIG. 7E( 5 wt %).

EXAMPLE 7

Same procedures as in Example 6 were repeated except that the soaking time was 5 hours. The SEM are respectively shown in FIG. 8A, FIG. 8B, FIG. 8C, FIG. 8D, and FIG. 8E. As can be seen from FIG. 8A to FIG. 8E, the sintered bodies were also densified. In FIG. 5E, the grain size ranges from 8 to 25 μm. This is a discontinuous grain growth phenomenon, and is likely caused due to the fineness of the powder manufactured.

COMPARATIVE EXAMPLE 2

Sample discs were prepared by the same procedures as in Example 3 except that no lithium fluoride was added thereto.

These sample discs were sintered respectively at 950° C., 1050° C., 1150° C., 1250° C., 1300° C. and 1350° C. with a soaking time of 5 hours. The SEM of fractured surface of the sintered bodies are respectively shown in FIGS. 9A-9F. As can be seen from FIGS. 9A-9F, a large amount of pores still remain in all the sintered bodies, no matter how they were sintered at a different temperature, showing that the sintered bodies were not densified.

EXAMPLE 8

Sample discs were prepared by the same procedures as set forth in Example 3, except that 0.5, 1, 2, 4, 5 percent by weight of lithium fluoride were respectively added. The sample discs were sintered at 1050° C. with a soaking time of 5 hours. The relative densities, linear shrinkages and thermal expansion coefficients(TEC) were measured. The results are shown in Table 1 and FIGS. 10-11.

TABLE 1

| LiF amount (wt %) | 0 | 0.5 | 1 | 2 | 3 | 4 | 5 |
|---|---|---|---|---|---|---|---|
| TEC value ($\times 10^{-7}$/°C.) | 8.3 | 7.6 | 9.4 | 8.2 | 8.3 | 6.9 | 5.2 |

As can be seen from the above Table 1, the thermal expansion coefficient of the sintered bodies prepared by the process of the invention are in the magnitude of $10^{-7}$/°C..

Also, FIG. 10 and FIG. 11 show that relative densities and linear shrinkages of the sintered bodies gradually increase with the increment of the amount of LiF, but start to reduce when the amount of LiF reaches 4 percent by weight. The relative density reaches 97.9% if the amount of LiF added is 4 percent by weight.

What is claimed is:

1. A process for preparing a $Li_2O$—$Al_2O_3$—$SiO_2$ ceramic sintered body, comprising the following steps:
    (a) preparing a $Li_2O$—$Al_2O_3$—$SiO_2$ ceramic powder from a solution of alumina sol, silica sol and lithium nitrate, wherein the molar ratio of $Li^+$: $Al^{+3}$: $Si^{+4}$ is 1:1:2;
    (b) calcining the powder at a temperature of 550° C.-750° C.;
    (c) intimately mixing a lithium fluoride powder with the calcined powder by using an alcohol as wetting agent, wherein the content of the lithium fluoride powder is 0.5-5 percent by weight based on the calcined powder;
    (d) drying and fabricating the resulting powder of step (c) into a molded article; and
    (e) sintering the molded article at a temperature of 950°-1250° C. to obtain the sintered body.

2. The process as claimed in claim 1, wherein the preparation of the $Li_2O$—$Al_2O_3$—$SiO_2$ ceramic powder comprises:
    (1) sequentially mixing the silica sol, the alumina sol and the lithium nitrate to form the solution wherein the molar ratio of $Li^+$:$Al^{+3}$:$Si^{+4}$ is 1:1:2;
    (2) subjecting the solution to hydrolyze at a temperature of 70°-80° C. to obtain a sol and allowing the sol to solidify for 70-90 minutes to obtain a gel:
    (3) drying the gel at a temperature of 40°-50° C. and grinding to obtain the $Li_2O$—$Al_2O_3$—$SiO_2$ ceramic powder.

3. The process as claimed in claim 2 wherein the silica sol is prepared by mixing tetraethylorthosilicate, ethanol, deionized water and hydrochloric acid at a molar ratio of 1:40:40:0.3; and the alumina sol is prepared by mixing aluminum tri-sec-butoxide, deionized water and hydrochloric acid at a molar ratio of 1:100:0.2.

4. The process as claimed in claim 1, wherein the calcination of step (c) is conducted at a temperature of 600° C. with a soaking time of 4 hours.

5. The process as claimed in claim 1, wherein the content of lithium fluoride is 4 percent by weight based on the calcinated powder and the alcohol is ethanol.

6. The process as claimed in claim 1, wherein the sintering of step (e) is conducted at a heating rate of 3° C./min with a soaking time of 2.5 hours.

7. The process as claimed in claim 1, wherein the sintering of step (e) is conducted at a heating rate of 3° C./min with a soaking time of 5 hours.

8. The process as claimed in claim 1, wherein the sintering is conducted at a temperature of 1050° C..

* * * * *